UNITED STATES PATENT OFFICE.

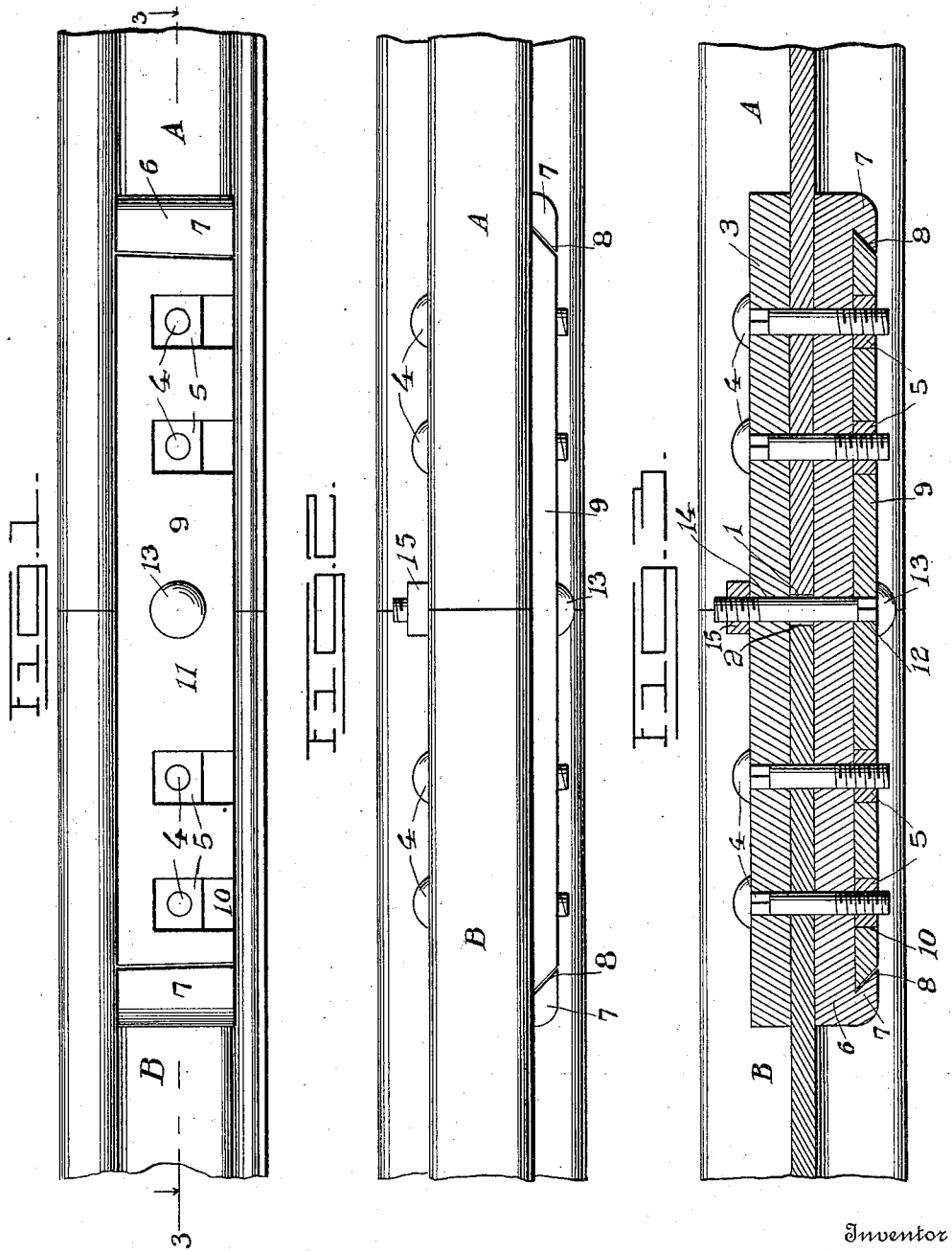

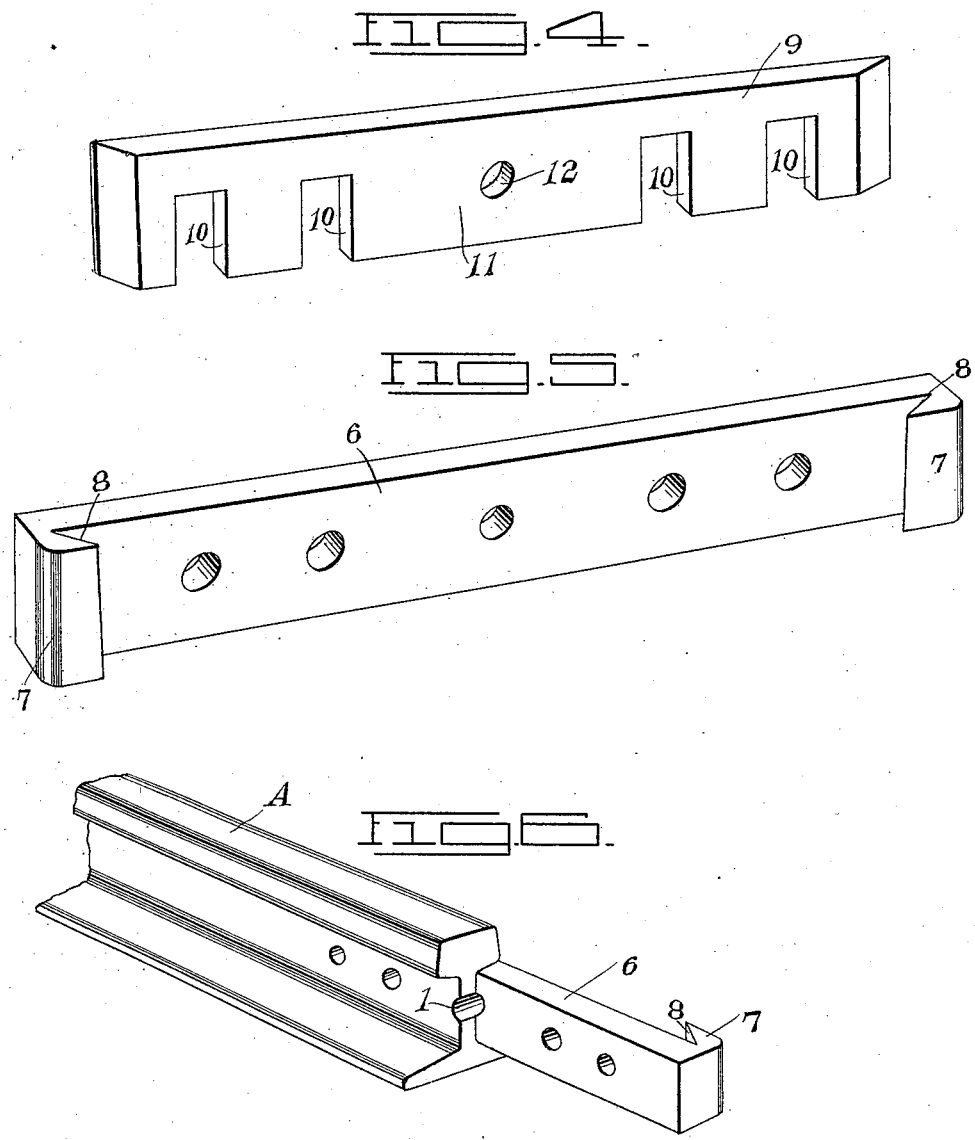

THEODORE H. KNIGHT, OF HAZLEHURST, MISSISSIPPI.

RAIL-JOINT.

1,054,565.   Specification of Letters Patent.   Patented Feb. 25, 1913.

Application filed August 2, 1911. Serial No. 641,944.

*To all whom it may concern:*

Be it known that I, THEODORE H. KNIGHT, a citizen of the United States, residing at Hazlehurst, in the county of Copiah and State of Mississippi, have invented new and useful Improvements in Rail-Joints, of which the following is a specification.

This invention relates to certain novel improvements in rail joints and nut locks therefor.

In carrying out my invention it is my purpose to provide a rail joint comprising a fish plate which is adapted to lie flush with the vertical faces of the coacting rails, the said plate having both its ends formed with shoulders, the under faces of which being inclined or beveled toward the outer ends of the plate, the said recessed portions are adapted to receive the beveled ends of a nut retaining plate and the said nut retaining plate being centrally formed with an opening through which is adapted to pass a bolt, said bolt engaging within substantially similar circular depressions formed in the webs of the coacting rails and to serve as an additional support for preventing the sagging or downward movement of the rails incident to the rolling stock passing thereon.

With the above recited objects, and others of a similar nature in view, the invention consists in the construction, combination and arrangement of parts set forth in and falling within the scope of the appended claim.

In the drawings,—Figure 1 is a front elevation of a rail joint and nut lock constructed in accordance with the present invention. Fig. 2 is a top plan view of the same. Fig. 3 is a horizontal sectional view taken upon the line 3—3 of Fig. 1. Fig. 4 is a detail view of the nut locking bar. Fig. 5 is a perspective view of one of the fish plates. Fig. 6 is a similar view illustrating one of the rail ends integrally formed with the fish plates.

Referring now to the drawings in detail, A and B designate the coacting ends of a pair of railway rails. The rails have the webs of their abutting ends each centrally provided with a substantially semi-cylindrical recess or depression 1 and 2, respectively.

The numeral 3 designates a fish plate which is arranged upon one of the sides of the rails, the said fish plate being preferably of a thickness equaling the distance between the vertical plane of the side of the rail head and the vertical face of the rail web, so that the said fish plate may provide a heavy body, and as its upper and lower longitudinal edges contact with the under face of the head and the base flange of the rails, respectively, the said fish plate renders an effective support for the said rails. The fish plate 3 as well as the webs of the rails are each provided with a plurality of spaced registering openings, the said openings being adapted to receive securing elements such as the usual bolts 4 which have their opposite ends connected with nuts 5.

The numeral 6 designates a fish plate for the opposite faces of the rail. This fish plate is also of a thickness equaling the distance between the vertical plane of the side of the rail head and the webs thereof, the said fish plate thus having its outer face flush with the faces of the heads of the rails, and the longitudinal edges of the said fish plate are adapted to contact with and engage between the heads of the rails and the base flanges thereof. This fish plate 6 is provided with a plurality of openings, adapted to receive the projecting ends of the bolts 4 and to have the nuts 5 of the said bolts contact with the face of the said plate. Both of the said fish plates are centrally provided with registering openings, the said openings being arranged in a line with semi-cylindrical depressions provided in the meeting ends of the rails. The opposite ends of the plate 6 are formed with undercut shoulders 7 which project a suitable distance beyond the face of the said plate, and the inner faces of the said shoulders are beveled or inclined as at 8 inwardly or toward the ends of the said plate 6, and the said beveled portions are inclined from the top toward the bottom of the shoulder 7.

The numeral 9 designates a nut locking plate. This plate has its opposite ends beveled and inclined to correspond with the beveled and inclined portions 8 of the shoulders 7, and it will be noted that by arranging the plate 6 flush with the faces of the heads of the rails, the plate may be readily dropped within the pockets provided by the shoulders. The plate 9 is provided with a plurality of openings 10, the same extending from the lower face of the plate to a suitable distance away from the top edge thereof, and the said openings are of a substantially rectangular formation so that the walls provided thereby will snugly engage with the nuts 5. The space between the openings adjacent the center of the plate is of a larger area than the space or portions of the plate adjacent the walls provided with the remaining openings, and this portion, designated by the numeral 11, is centrally provided with an opening 12, said opening being adapted for the reception of a bolt 13, and this bolt passes through the semi-cylindrical openings provided in the webs of the rails and also through a similar opening 14 provided centrally of the plate 3. The threaded projecting portion of the bolt 13 is adapted to receive a suitable nut 15.

The fish plate 6, as illustrated in Fig. 6 of the drawings, is preferably integrally formed with the rail A, the said plate of course extending a suitable distance beyond the end of the said rail, and the said extending portion being adapted to engage between the head and base flange as well as contact with the web of the coacting rail as will readily be understood.

From the above description, taken in connection with the accompanying drawings, the simplicity of the structure, as well as the advantages thereof, will, it is thought, be perfectly apparent to those skilled in the art to which such inventions appertain without further detailed description, it being merely necessary to add that the nature of the invention admits of various changes, as to size, proportion, etc., which may be resorted to without departing from or sacrificing any of the advantages of the same.

Having thus fully described the said invention, what I claim is:—

The combination with the meeting ends of two members having a head, a base flange, and a joining web portion, a plate secured to one side of the web portions, and bolts passing through the plate and web portions, of a locking plate secured to the opposite sides of the webs and having openings therein adapted to receive the ends of the said bolts, said plate being of a thickness equal to the width of the laterally projecting portion of the head of the coacting members and provided at each end thereof with outwardly projecting shoulders having their inner faces horizontally beveled and downwardly and inwardly inclined, a second plate having its ends beveled and downwardly and inwardly inclined for insertion in the box formed by the beveled faces of said shoulders, said second plate adapted for vertical movement and provided in its lower end with rectangular cut-away portions adapted to receive the nuts of said bolts, said plates being provided with central, transverse openings in alinement with the openings provided by cut away portions of the ends of the meeting members and an opening in the oppositely positioned plate, and a bolt member adapted to be received within said openings to secure the locking plate in position.

In testimony whereof I affix my signature in presence of two witnesses.

THEODORE H. KNIGHT.

Witnesses:
C. I. ALLEN,
M. N. HAMILTON.

---

Copies of this patent may be obtained for five cents each, by addressing the "Commissioner of Patents, Washington, D. C."